Sept. 25, 1928.
J. D. RAUCH
MOTOR TRUCK WHEEL
Filed Sept. 18, 1926
1,685,294
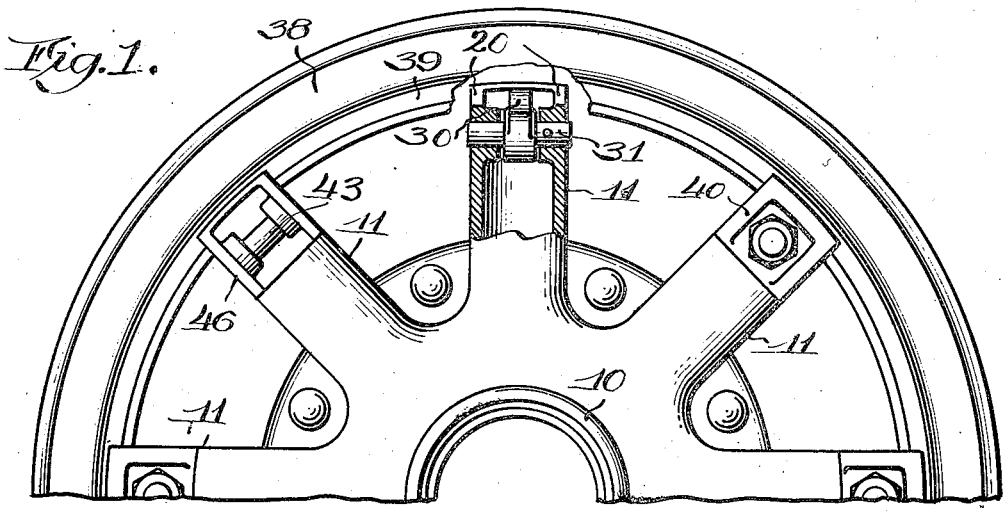
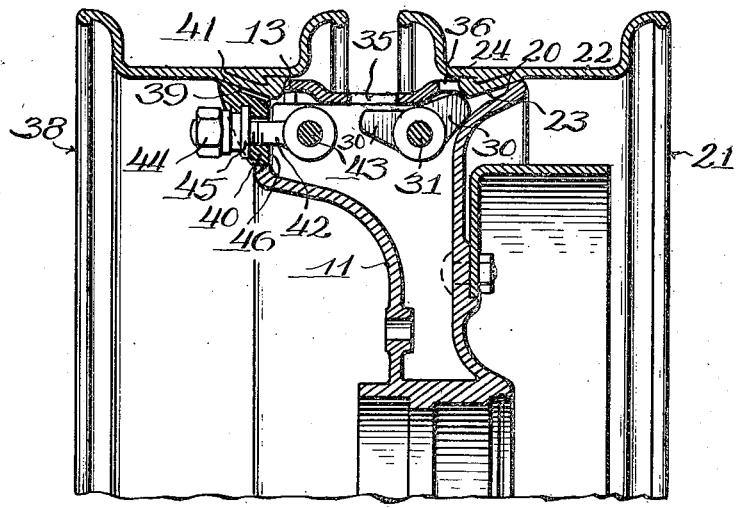
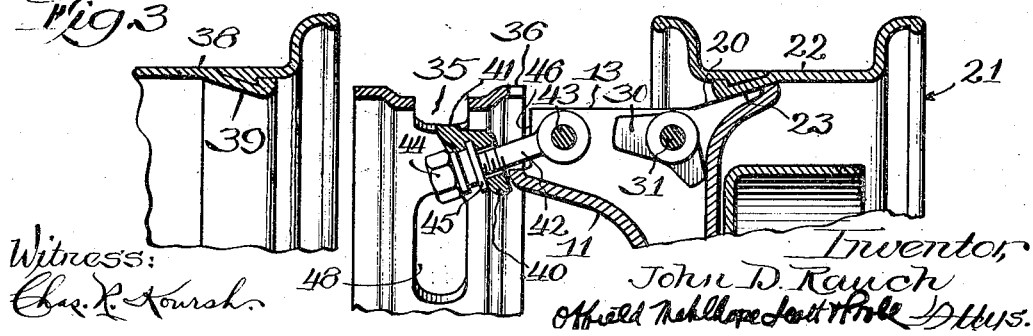

Patented Sept. 25, 1928.

1,685,294

UNITED STATES PATENT OFFICE.

JOHN D. RAUCH, OF LIMA, OHIO.

MOTOR-TRUCK WHEEL.

Application filed September 18, 1926. Serial No. 136,209.

This invention relates to improvements in motor truck wheels and more particularly to wheels of the dual pneumatic tire type.

The principal object of the present invention is to produce an improved form of integral cast steel wheel of the character described, wherein the tires may be readily mounted and dismounted, and the attaching devices need not be removed from the wheel when changing the tires.

A further object of the invention is to provide means for ventilation about and between the tire supports which is found to be desirable in wheels of this character.

The invention may best be understood by reference to the accompanying drawing, in which Figure 1 is a front view showing a semi-section of a wheel constructed in accordance with my invention, with the tire rims mounted thereon, and with parts broken away to show the inner locking pawl.

Figure 2 is an enlarged vertical section, showing the tire rims in mounted and locked position.

Figure 3 is a composite view similar to Figure 2, but with the outer tire rim and spreader ring removed from the wheel.

Referring to details shown in the drawings, the main wheel body consists of a hub 10 and radiating spokes 11 in the form of a single integral casting, each of the spokes being hollow, and open at its outer end to form relatively wide bearing faces 13, 13, on the two side walls thereof, as is best seen in Figure 3. An inner portion 20 of the bearing faces is inclined upwardly and outwardly to form a seat for the inner tire rim, indicated generally at 21. The remaining portions of the bearing surfaces are substantially parallel with the axis of the wheel so as to permit the inner tire rim 21 to be readily fitted over the wheel from the outside face thereof.

The inner tire rim 21 may be of any suitable form, as for example, it may be of the interlocking rim type having an under section 22 formed with the inclined lower bearing face 23 which is adapted to fit on the inclined bearing surfaces 20, on the wheel spokes, and an overlapping section 24. It will be understood, however, that many other forms of demountable rims may be used in connection with a wheel of the present invention.

The inner tire rim is initially secured in place by means of one or more lugs 30, a single lug being usually preferable, as shown. Said lug 30 is pivotally mounted on a pin 31 extending across the upper spoke shown in the drawing. One end of said lug is adapted to be swung inwardly into engagement with the outer side of the inner tire rim section 22 and thus hold the entire rim in place. A spreader ring 35 is fitted over the ends of the spokes in sliding engagement with the upper surfaces thereof, and engages the outer side of the inner tire rim 21 around its entire periphery. Said ring also serves to hold the lug 30 in locked position, in the form shown having a notched portion 36 which registers with said lug and holds the latter securely in position against the adjacent face of the inner rim, when in locking position shown in Figure 2. The outer tire rim 38 is arranged to be slipped over the outer edge of the wheel spokes with its inner periphery extending over the spreader ring, as shown in Figure 2.

The outer tire rim 38 is preferably similar to, and interchangeable with the inner rim 24, having an inclined lower bearing surface 39 of the same shape as said inner rim and when in mounted position, as shown, being turned in reversed relation to the wheel.

The outer rim is secured by means of a plurality of lugs 40, 40, mounted on the spokes and each having an inclined upper surface 41 which engages the inclined under surface of the outer tire rim. Each of the lugs 40 is carried on a threaded rod 42 which is pivotally mounted on a pin 43 having its axis spaced inwardly from the outer margin of the wheel and transversely of the side walls of its respective spoke. Each lug 40 is adjusted longitudinally of its pin by means of a nut 44 having a collar 45 having bearing within the body of said lug so as to carry the latter in all positions of adjustment of said nut. The arrangement is such that when in locked position the lug is seated in a socket 46 formed in the adjacent walls of the spoke, but upon loosening the nut 44 the lug 40 is withdrawn bodily from its socket to a point where the lug may be swung downwardly upon the axis of the pivot pin and out of the path of the outer tire rim 38 and spreader ring 35, as clearly shown in Figure 3.

Holes 48, 48, are preferably formed around the central portion of the spreader ring at suitable intervals, as shown, so as to provide free ventilation to the spaces between the tires.

The use and operation of the device described probably will already be manifest to those skilled in the art. The two tire rims are mounted with the parts arranged as shown in Figure 3, in which the locking end of lug 30 is swung downwardly into the wheel spoke and all of the lugs 40, 40, are also swung downwardly, so as to permit the rims and ring 35 to be assembled. The inner rim engages the inclined surfaces 20, 20, which form thrust shoulders therefor. The lug 30 is swung upwardly before ring 35 is applied, so as to be locked in place as shown in Figure 2. The outer rim 38 is last to be applied, and then the whole structure is secured by lugs 40, 40, as shown.

Among the advantages of the construction above described, are the ruggedness afforded by the single casting forming the hub and spokes of the device, and the simplicity of operation of the mounting and demounting devices wherein only one part, namely, the spreader ring, need be removed when changing both tires and no loose parts are taken off when removing the outer tire. The provision of ventilating holes, opening between the spokes, affords ventilation for all sides of the tires, which has been found very essential in large size pneumatic tires.

I claim as my invention:

1. In a dual tire wheel, a hub and radiating spokes, a pair of tire rims adapted to be demountably secured on the ends of said spokes from the outer side of said wheel, each of said spokes having an outwardly facing bearing surface with a thrust shoulder along the inner side thereof for engagement with the inner tire rim, rocking pawls mounted on said spokes and movable into and out of locking engagement with the outer side of said inner tire rim when the latter is in mounted position, lugs movably attached at the outer side of said spokes for clamping engagement with the outer tire rim, and a removable spreader ring adapted to fit over the ends of said spokes between said tire rims, said spreader ring having engagement with said rocking pawls to hold them in locked position.

2. In a dual tire wheel, a hub and hollow radiating spokes formed of a single casting, a pair of tire rims adapted to be demountably secured directly on the ends of said spokes, each of said spoke ends having its marginal walls offset radially at the inner side of said wheel to form a thrust shoulder for engagement with the inner tire rim, rocking pawls pivotally mounted within said spokes on a transverse axis, and movable into and out of locking engagement with the outer side of said inner tire rim, lugs movably attached at the outer side of said spokes for clamping engagement with the outer tire rim, and a removable spreader ring interposed between said tire rims and having engagement with said rocking pawls to hold them in locked position.

Signed at Chicago, Ill., this 15th day of Sept., 1926.

JOHN D. RAUCH.